(12) United States Patent
Gupta et al.

(10) Patent No.: US 11,985,572 B2
(45) Date of Patent: *May 14, 2024

(54) METHOD AND APPARATUS FOR TRANSMITTING AND RECEIVING DATA IN MISSION CRITICAL DATA COMMUNICATION SYSTEM

(71) Applicant: Samsung Electronics Co., Ltd., Suwon-si (KR)

(72) Inventors: Nishant Gupta, Sitapur (IN); Monika Jalota, Bangalore (IN); Sangameshwara Vijay, Bangalore (IN); Sapan Pramodkumar Shah, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/332,371

(22) Filed: Jun. 9, 2023

(65) Prior Publication Data

US 2023/0319519 A1 Oct. 5, 2023

Related U.S. Application Data

(63) Continuation of application No. 17/354,328, filed on Jun. 22, 2021, now Pat. No. 11,689,897, which is a
(Continued)

(30) Foreign Application Priority Data

Mar. 25, 2017 (IN) .............................. 201741010591
Mar. 21, 2018 (IN) .............................. 201741010591

(51) Int. Cl.
*H04L 69/28* (2022.01)
*H04L 5/00* (2006.01)
(Continued)

(52) U.S. Cl.
CPC ............. *H04W 4/14* (2013.01); *H04L 5/0048* (2013.01); *H04L 51/04* (2013.01); *H04L 51/226* (2022.05); *H04W 4/18* (2013.01); *H04W 4/70* (2018.02)

(58) Field of Classification Search
CPC ........ H04W 4/14; H04W 4/70; H04L 5/0048; H04L 51/04; H04L 51/226
See application file for complete search history.

(56) References Cited

U.S. PATENT DOCUMENTS 10,719,254 B2 7/2020 Lin et al.
10,896,593 B1 1/2021 Nitsch et al.
(Continued)

FOREIGN PATENT DOCUMENTS

CN 1757248 A 4/2006
CN 104618349 A 5/2015
(Continued)

OTHER PUBLICATIONS

3GPP TSG-SA WG6, S6-XXXXX Title: Public safty prioritization for MCData and MCVideo functions, features and capabilities (Year: 2016).*
(Continued)

*Primary Examiner* — Faruk Hamza
*Assistant Examiner* — Abusayeed M Haque
(74) *Attorney, Agent, or Firm* — Jefferson IP Law, LLP

(57) ABSTRACT

The embodiments herein provide a method for managing short data service (SDS) disposition notifications in a Mission Critical Data (MCData) communication system. The method includes identifying, by a receiving MCData User Equipment (UE), SDS disposition request type Information Element (IE) in a SDS message received from a transmitting MCData UE. Further, the method includes initiating, by the receiving MCData UE, a timer when the disposition request (Continued)

type Information Element (IE) is set as Delivery and Read. Furthermore, the method includes transmitting, by the receiving MCData UE, a consolidated disposition notification to the transmitting MCData UE by stopping the timer when the SDS message is read before expiry of the timer.

20 Claims, 5 Drawing Sheets

Related U.S. Application Data continuation of application No. 16/496,146, filed as application No. PCT/KR2018/003474 on Mar. 23, 2018, now Pat. No. 11,096,020.

(51) Int. Cl.
| | |
|---|---|
| *H04L 51/04* | (2022.01) |
| *H04L 51/226* | (2022.01) |
| *H04W 4/14* | (2009.01) |
| *H04W 4/18* | (2009.01) |
| *H04W 4/70* | (2018.01) |
| *H04W 68/00* | (2009.01) |

(56) References Cited

U.S. PATENT DOCUMENTS

| | | | |
|---|---|---|---|
| 10,925,112 B2 | 2/2021 | Ge et al. | |
| 11,689,897 B2* | 6/2023 | Gupta | H04L 51/23 370/312 |
| 2002/0138670 A1* | 9/2002 | Johnson | G06F 3/0659 710/6 |
| 2003/0233421 A1 | 12/2003 | Shibata et al. | |
| 2004/0230795 A1* | 11/2004 | Armitano | H04L 63/10 713/165 |
| 2004/0243692 A1* | 12/2004 | Arnold | G06F 9/5016 711/170 |
| 2009/0012932 A1* | 1/2009 | Romem | G06F 11/18 |
| 2010/0153505 A1 | 6/2010 | Oh et al. | |
| 2010/0238161 A1* | 9/2010 | Varga | G06T 19/006 345/157 |
| 2010/0240988 A1* | 9/2010 | Varga | G06F 3/011 600/425 |
| 2012/0231823 A1 | 9/2012 | Kung | |
| 2013/0162632 A1* | 6/2013 | Varga | H04N 13/383 345/419 |
| 2013/0173730 A1 | 7/2013 | Hundscheidt et al. | |
| 2014/0130055 A1 | 5/2014 | Guha | |
| 2014/0240313 A1* | 8/2014 | Varga | H04N 13/383 345/419 |
| 2017/0039527 A1 | 2/2017 | Rangan | |
| 2017/0238154 A1* | 8/2017 | Vagelos | H04W 4/14 455/466 |
| 2018/0359612 A1 | 12/2018 | Buckley et al. | |
| 2019/0044980 A1 | 2/2019 | Russell et al. | |
| 2019/0289439 A1 | 9/2019 | Sangameshwara et al. | |
| 2019/0334969 A1 | 10/2019 | Ge et al. | |
| 2020/0314800 A1 | 10/2020 | Xu | |
| 2021/0234647 A1 | 7/2021 | Lee et al. | |

FOREIGN PATENT DOCUMENTS

| | | |
|---|---|---|
| EP | 1 597 926 A2 | 11/2005 |
| WO | 2004/077842 A2 | 9/2004 |

OTHER PUBLICATIONS

3GPP TSG-SA WG6 Meeting324, S6-180774 Title: Discussion on support of MCData disposition history interrogation (Year: 2018).*
3GPP TS 24.582 V0.2.0, '3GPP, TSG CN, Mission Critical Data (MCData) media plane control, Protocol specification (Release 14)', Mar. 8, 2017, See sections 6.1.1.2-6.1.1.3, 6.1.2.3, 6.3.2.2, Valbonne, France.
3GPP TS 24.282 V0.1.0, '3GPP; TSG CN; Mission Critical Data (MCData) signalling control, Protocol specification (Release 14)', Feb. 5, 2017, See sections 6.2.2.1-6.2.2.2, 9.2.1.2, Valbonne, France.
Motorola Solution et al., 'The plane used for disposition request and notification', C1-170798, 3GPP TSG-CT WG1 Meeting #102, Dubrovnik, Croatia, Feb. 13-17, 2017, See pp. 1-2.
Motorola Solution et al., 'Data Transmission and Disposition during an SDS session', C1-170797, 3GPP TSG-CT WG1 Meeting #102, Dubrovnik, Croatia, Feb. 13-17, 2017, See pp. 1-3.
3GPP TS 24.282 V14.2.0, Mission Critical Data (MCData) signalling control, 3rd Generation Partnership Project, Dec. 2017, Valbonne, France.
3GPP TS 23.282, V14. 1. 0, 3rd Generation Partnership Project, 1-15 Technical Specification Group Services and System Aspects, Functional architecture and information flows to support Mission Critical Data (MCData), Stage 2 (Release14) Mar. 16, 2017, XP051290519, Valbonne, France.
Extended European Search Report dated Nov. 14, 2019, issued in European Patent Application No. 18774228.3.
Motorola Solutions et al: "Pseudo-CR on SDS over media plane—client procedures",3GPP TSG-CT WG1 Meeting #102 C1-170800 Dubrovnik (Croatia), Feb. 13-17, 2017, XP051219517, C1-170800. Functional architecture and information flows to support Mission Critical Data (MCData), 3GPP, 3GPP TS 23.282 V14.0.0, Dec. 2016.
Chinese Office Action dated Apr. 1, 2021, issued in Chinese Application No. 201880021204.X.
Extended European Search Report dated Feb. 4, 2021, issued in European Application No. 20209937.0.
Samsung Electronics, "Off-network information flows for SDS", S6-170194, 3GPP TSG-SA, WG6 Meeting #15, Jeju Island South Korea, Feb. 13-17, 2017.
European Office Action dated Nov. 23, 2022, issued in European Application No. 20 209 937.0.

* cited by examiner

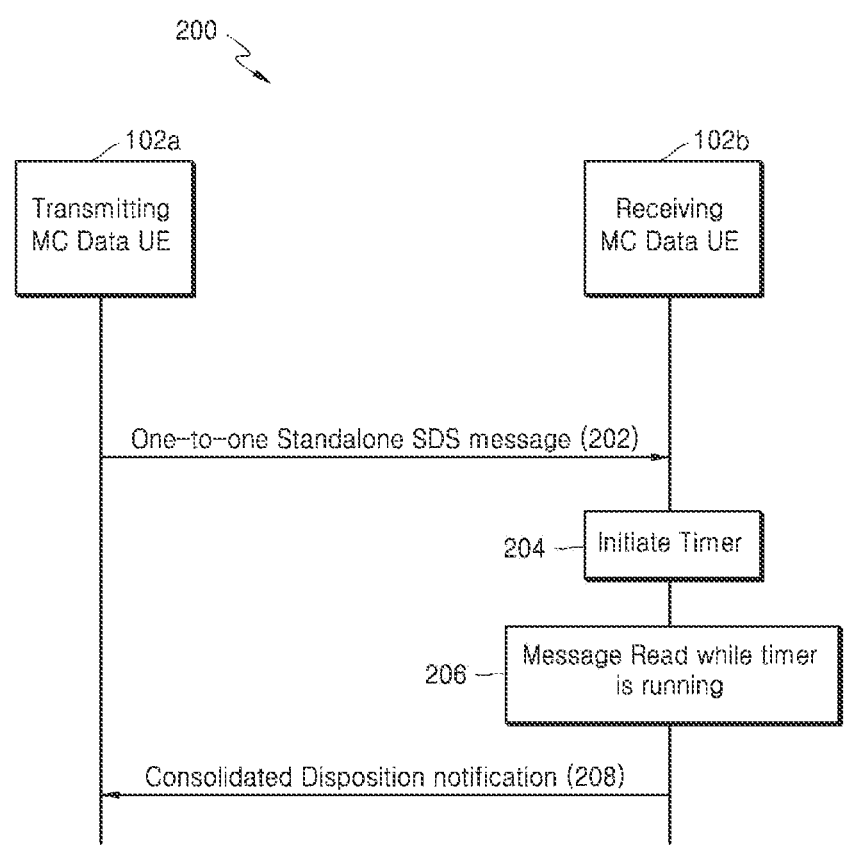

METHOD AND APPARATUS FOR TRANSMITTING AND RECEIVING DATA IN MISSION CRITICAL DATA COMMUNICATION SYSTEM

CROSS-REFERENCE TO RELATED APPLICATION(S)

This application is a continuation application of prior application Ser. No. 17/354,328 filed on Jun. 22, 2021, which has issued as U.S. Pat. No. 11,689,897 on Jun. 27, 2023; which application is a continuation application of prior application Ser. No. 16/496,146 filed on Sep. 20, 2019, which has issued as U.S. Pat. No. 11,096,020 on Aug. 17, 2021; which is a U.S. National Stage application under 35 U.S.C. § 371 of an International application number PCT/KR2018/003474 filed on Mar. 23, 2018; and which is based on and claims priority of an Indian patent application number 201741010591 filed on Mar. 25, 2017 in the Indian Intellectual Property Office, and of an Indian patent application number 201741010591 filed on Mar. 21, 2018 in the Indian Intellectual Property Office, the disclosure of each of which is incorporated by reference herein in its entirety.

TECHNICAL FIELD

The present disclosure relates to Mission Critical Data (MCData) communication system, and more particularly related to a method and system for managing Short Data Service (SDS) disposition notifications in a MCData communication system. The present application is based on, and claims priority from an Indian Application Number 201741010591 filed on 25th Mar. 2017, the disclosure of which is hereby incorporated by reference herein.

BACKGROUND ART

Public safety networks are used for Mission Critical (MC) Data/Voice/Video communications. The MC communication may include defined set of MCData services. Such MCData services typically build on existing third generation partnership project (3GPP) transport communication mechanisms provided by the evolved packet system (EPS) architectures to establish, maintain, and terminate the actual communication path(s) among the users. Typically, a MCData server provides centralized support for such MCData services. The MCData server further can facilitate or govern MCData communication among various users part of the network.

In an alternate deployment, such MCData services can be off-network. In such deployments the MCData devices communicate directly with each other without a server for centralized support for the service.

The MCData services are designed to provide one-to-one, one-to-many, and group communications between users. In the present scenario, the public safety community requires services beyond voice i.e. data and video applications. MCData makes frequent use of a set of capabilities and enablers that allows for many end user services to be built on a common platform. A Short data service (SDS) feature is one such capability for use in the MCData Service. The SDS can be used on its own or in combination with other services, or may be used by other services to realize certain features such as sharing of a location, presence-like data, and command instructions to perform specific operations. The SDS functionality may include one-to-one messaging or one-to-many or group messaging. Further the SDS messages can be a standalone SDS messages or part of a SDS session.

The above information is presented as background information only to help the reader to understand the present invention. Applicants have made no determination and make no assertion as to whether any of the above might be applicable as prior art with regard to the present application.

DISCLOSURE

Technical Problem

Effective system and methods are necessary to support various features of SDS for reducing number of retransmissions for disposition notifications and to optimize the resource consumption for disposition requests and notifications.

Technical Solution

The principal object of the embodiments herein is to provide a method and system for managing short data service (SDS) disposition notifications in a Mission Critical Data (MCData) communication system.

Another object of the embodiments herein is to provide a method for consolidating a "delivered" notification and a "read" notification at a receiving MCData UE into a single "delivered and read" notification upon receipt of a SDS message.

Another object of the embodiments herein is to initiate a timer at the receiving MCData UE when a disposition request type Information Element (IE) in the SDS message is set as "Delivery and Read".

Another object of the embodiments herein is to transmit a consolidated disposition notification to the transmitting MCData UE by stopping the timer when the SDS message is read before expiry of the timer.

Another object of the embodiments herein is to provide a method for consolidated disposition notifications in an on-network MCData communication system for SDS.

Yet another object of the embodiments herein is to provide a method for consolidated disposition notifications in an off-network MCData communication system for SDS.

Advantageous Effects

By the method of the present application, various features of SDS are supported for reducing number of retransmissions for disposition notifications and to optimize the resource consumption for disposition requests and notifications.

DESCRIPTION OF DRAWINGS

This invention is illustrated in the accompanying drawings, throughout which like reference letters indicate corresponding parts in the various figures. The embodiments herein will be better understood from the following description with reference to the drawings, in which:

FIG. 2 is an example off-network MCData communication system in which the receiving MCData UE transmits a consolidated disposition notification to the transmitting MCData UE, according to an embodiment as disclosed herein;

BEST MODE

Figure 1A:
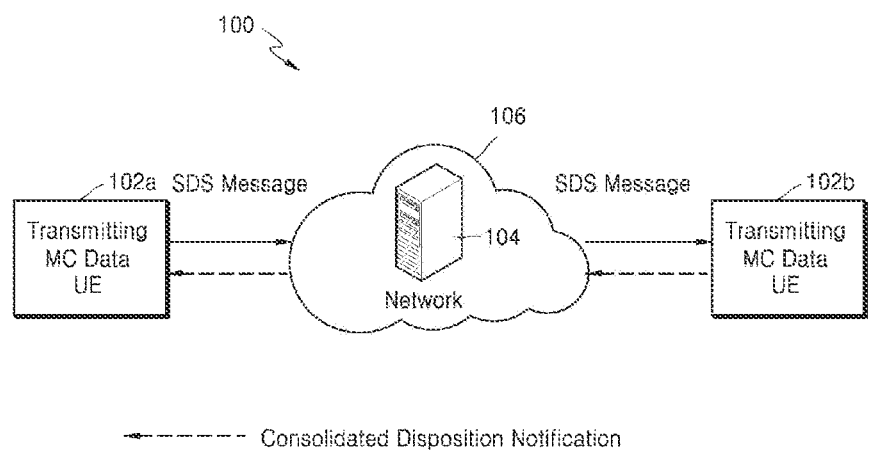
FIG. 1A illustrates an example on-network MCData communication system in which a receiving MCData UE transmits a consolidated disposition notification to a transmitting MCData UE, according to an embodiment as disclosed herein.

Accordingly, the embodiments herein provide a method for managing short data service (SDS) disposition notifications in a Mission Critical Data (MCData) communication system. The method includes identifying, by a receiving MCData User Equipment (UE), SDS disposition request type Information Element (IE) in a SDS message received from a transmitting MCData UE. Further, the method includes initiating, by the receiving MCData UE, a timer when the disposition request type IE is set as Delivery and Read. Furthermore, the method includes transmitting, by the receiving MCData UE, a consolidated disposition notification to the transmitting MCData UE by stopping the timer when the SDS message is read before expiry of the timer.

Accordingly the embodiments herein provide a receiving MCData UE for managing SDS disposition notifications in a MCData communication system. The MCData UE includes a disposition notification engine configured to identify SDS disposition request type IE in a SDS message received from a transmitting MCData UE. Further, the disposition notification engine configured to initiate a timer when the disposition request type IE is set as Delivery and Read. Furthermore, the disposition notification engine is configured to transmit a consolidated disposition notification to the transmitting MCData UE by stopping the timer when the SDS message is read before expiry of the timer.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

MODE FOR INVENTION

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments. Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The term "transmitting" and "receiving" herein are used merely for labeling purpose and can be used interchangeably without departing from the scope of the embodiments. It should be noted that the embodiments in this disclosure are applicable to both on-network MCData communication system and off-network MCData communication system and are also applicable to one-to-one communication and group communication for the short data service.

The terms "read" and "render" are used interchangeably in this specification and mean that the MCData client has displayed or processed the received SDS message for user consumption. In an embodiment, the received SDS message is processed by the MCData UE for user consumption. Once the MCData UE has displayed the SDS message, it indicates the MCData client, with a display indication, to send an appropriate disposition notification.

The embodiments herein achieve a method for managing disposition notifications in an off-network short data service and/or on-network short data service. The method includes identifying, by a receiving MCData User Equipment (UE), SDS disposition request type Information Element (IE) in a SDS message received from a transmitting MCData UE. Further, the method includes initiating, by the receiving MCData UE, a timer when the disposition request type Information Element (IE) is set as Delivery and Read. Furthermore, the method includes transmitting, by the receiving MCData UE, a consolidated disposition notification to the transmitting MCData UE by stopping the timer when the SDS message is read before expiry of the timer.

In an embodiment, the consolidated disposition notification comprises of a 'Delivery' notification and a 'Read' notification to the transmitting MCData UE.

In an embodiment, the receiving MCData UE transmits a 'Delivered' notification to the transmitting MCData UE when the SDS message is not read before expiry of the timer.

In an embodiment, the receiving MCData UE transmits a 'Read' notification to the transmitting MCData UE when the SDS message is read after expiry of the timer.

In an embodiment, a time interval associated with the timer for transmitting the consolidated disposition notification is configurable.

In an embodiment, the consolidated disposition notification is transmitted by stopping the timer when the SDS message is read before expiry of the timer during at least one of one-to-one communication and group communication with the transmitting MCData UE.

In an embodiment, the consolidated disposition notification is transmitted by stopping the timer in at least one of On-Network MCData communication system and Off-Network MCData communication system.

In an embodiment the received SDS message, either one-to-one SDS message or group SDS message, can be one of the standalone SDS message or a SDS message part of a SDS session.

With MCData SDS, a MCData User Equipment (UE) can send short data messages to other MCData users, both in on-network and in off-network. Further, the SDS also allows disposition notification requests, namely—'delivery', 'read', 'delivery and read'. A transmitting MCData UE can request a receiving MCData UE to send disposition notifications for 'delivery', for 'read' and for both 'delivery and read'. A delivery notification is an indication that the SDS message was received by the receiving MCData client. A read notification is an indication that the SDS message was rendered for the user by the receiving MCData UE.

In existing systems, the receiving MCData UE sends two separate and independent disposition notifications (i.e., Delivery notification, on receiving the SDS message and a Read notification, on rendering the SDS message for the user). In the off-network MC communications, transmission bandwidth is limited and of utmost importance. With the increase in the number of transmissions, resources are consumed and this reduces the overall performance of the system.

Meanwhile, the proposed exemplary embodiment allows the receiving MCData UE to consolidate the "delivered" notification and "read" notification into a single "delivered and read" notification, upon receipt of the SDS message. This consolidation helps in reducing the disposition notification traffic by up to 50% which results in less resource consumption in both the on-network MCData communication system and the off-network MCData communication system.

The proposed exemplary embodiment of transmitting the consolidated disposition notification can be used with any messaging services and is not limited to MCData. Further, the proposed exemplary embodiment can be used to provide a set of procedures, related timers and counters, for the transmitting MCData UE and the receiving MCData UE to successfully transmit, receive and acknowledge successful receipt of the SDS message.

Referring now to the drawings, and more particularly to FIGS. 1A through 6, where similar reference characters denote corresponding features consistently throughout the figures, there are shown preferred embodiments.

FIG. 1A illustrates an example on-network MCData communication system in which a receiving MCData UE transmits a consolidated disposition notification to a transmitting MCData UE, according to an embodiment as disclosed herein.

Figure 1B:
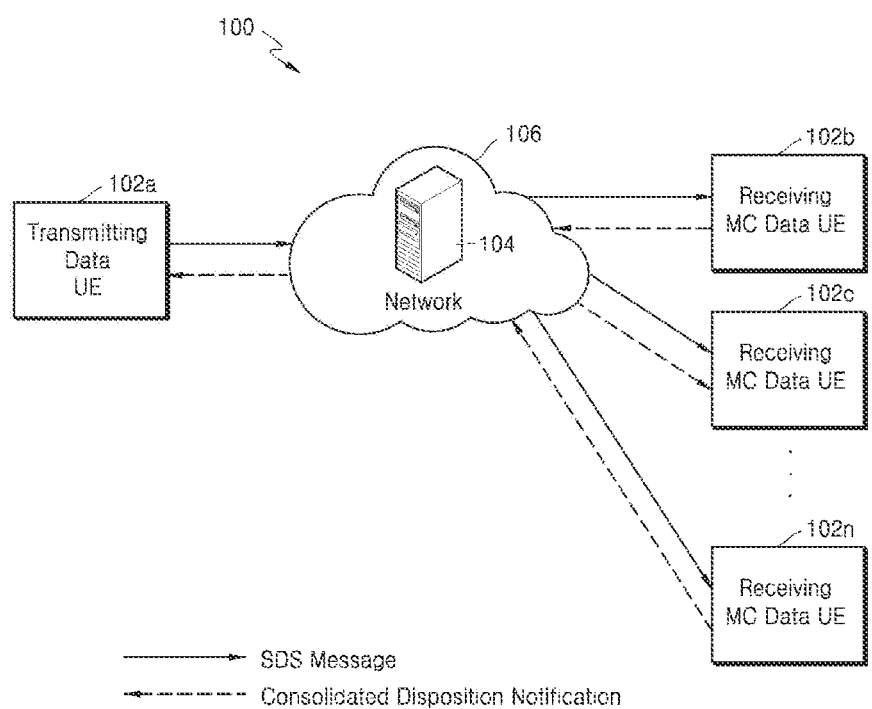
FIG. 1B illustrates an example on-network MCData communication system in which a plurality of receiving MCData UEs transmit a consolidated disposition notification to the transmitting MCData UE, according to an embodiment as disclosed herein.

Before describing the embodiments in detail, the MCData communication system is described herein briefly. In general, as shown in FIGS. 1A and 1B, a MCData communication system 100 includes a transmitting MCData UE 102a, a group of receiving MCData UEs 102b-102n and a MCData server 104 in a network 106. The MCData server 104 serves as a centralized server to enable the network 106 to provide MCData service to MCData UEs 102a-102n.

In some examples, the network 106 includes 3GPP E-UTRAN access elements (not shown) and 3GPP E-UTRAN core elements (not shown). For example, the transmitting MCData UE 102a gains access to the network 106 through a LTE-Uu interface (not shown) or through an evolved Node B (eNB, not shown). Further, the MCData server 104 may couple to various access/core elements of the network 106. For example, the MCData server 104 can couple to a serving gateway/packet data gateway through one or more suitable interface reference points. Various core elements such as mobile management entity (MME) and multimedia broadcast/multicast service gateway (MBMS GW) may provide core 3GPP E-UTRAN services to the MCData server 104 and/or the MCData UEs 102a-102n, to facilitate MCData communication services by the network 106.

In an embodiment, the MCData UEs 102a-102n can be for e.g., an electronic device, a User Equipment (UE), or the like. Each of the MCData UEs 102a-102n can include a MCData client (i.e., an application) for communicating with the MCData server 104. The first MCData UE 102a includes a first MCData client; the second MCData UE 102b includes a second MCData client and so on.

The MCData client residing at each of the MCData UEs 102a-102n, acts as user agent for all the MCData application transactions. The MCData client supports SDS, file distribution, data streaming and IP connectivity MCData capabilities utilized by MCData services like conversation management, robots control, enhanced status, database enquiries and secured internet.

The MCData server 104 provides centralized support for MCData services suite. Conversation management, robots, enhanced status, database enquiries and secured internet MCData services requiring one-to-one data or group communication are realized using SDS, file distribution, data streaming and Internet Protocol (IP) connectivity MCData communication capabilities. All the MCData clients supporting users belonging to a single group are required to use the same MCData server 104 for that group. In one embodiment, HTTP is used as communication transport means for MCData communication.

Now referring to the FIG. 1A, the MCData communication system 100 includes the transmitting MCData UE 102a, the MCData server 104 in the network 106 and the receiving MCData UE 102b. The MCData server 104 facilitates/ provides one-to-one SDS communication between the first MCData UE 102a and the second MCData UE 102b through the network 106.

The transmitting MCData UE 102a transmits a one-to-one SDS message to the MCData server 104 in the network 106. The one-to-one SDS message includes a SDS disposition request type Information Element (IE) set as 'Delivery and Read'. The MCData server 104 receives the one-to-one SDS message from the transmitting MCData UE 102a and transmits the one-to-one SDS message to the receiving MCData UE 102b. After receiving the one-to-one SDS message, the receiving MCData UE identifies the SDS disposition request type IE which is set as 'Delivery and Read' in the one-to-one SDS message.

Further, the receiving MCData UE 102b initiates a timer (i.e., TDU1 timer, which is related to the on-network data communication system 100). When the timer is running and the one-to-one SDS message is read by the MCData client at the receiving MCData UE 102b, before the expiry of the timer, then the receiving MCData UE 102b stops the running timer and transmits the consolidated disposition notification which includes "Delivery and Read" notification to the transmitting MCData UE 102a. The time interval or the value of the TDU1 timer for transmitting the consolidated disposition notification to the transmitting MCData UE 102b is configurable.

In an embodiment, the receiving MCData UE 102b transmits a 'Delivered' notification to the transmitting MCData UE 102a when the one-to-one SDS message is not read before expiry of the timer.

In another embodiment, the receiving MCData UE 102b transmits a 'Read' notification to the transmitting MCData UE 102a when the one-to-one SDS message is read after expiry of the timer.

Thus, with the proposed exemplary embodiment, in the on-network MCData communication system 100, the receiving MCData UE 102b initiates the TDU1 timer and transmits the consolidated disposition notification to the transmitting MCData UE 102a by stopping the timer when the one-to-one SDS message is read before expiry of the timer. This reduces the number of transmissions of Delivery notification and Read notification separately to the transmitting MCData UE 102b.

FIG. 1B illustrates an example on-network MCData communication system 100 in which a plurality of receiving MCData UEs transmit a consolidated disposition notification each to the transmitting MCData UE, according to an embodiment as disclosed herein.

For group communication, the transmitting MCData UE 102a transmits a group SDS message to a plurality of receiving MCData UEs 102b-102n through the MCData server 104. The group SDS message includes a SDS disposition request type IE set as 'Delivery and Read'. After receiving the group SDS message, each of the receiving MCData UE (i.e., 102b-102n) identifies the SDS disposition request type IE in the group SDS message which is set as 'Delivery and Read'.

Further, each of the receiving MCData UE 102b initiates a timer (i.e., TDU1 timer) after identifying the SDS disposition request type Information Element (IE) (which is set as 'Delivery and Read'). When the timer is running and the group SDS message is read by the MCData client at the receiving MCData UEs (102b-102n) before the expiry of the timer, then each one of the receiving MCData UEs (102b-102n) stops the running timer and transmits the consolidated disposition notification individually which includes 'Delivery and Read' notification to the transmitting MCData UE 102a. The time interval or the value of the TDU1 timer for transmitting the consolidated disposition notification to the transmitting MCData UE 102b is configurable.

In case, when the group SDS message is not read before the expiry of timer (i.e., TDU1 timer), the receiving MCData UE 102b transmits a 'Delivered' notification to the transmitting MCData UE 102a. In another scenario, when the group SDS message is read after expiry of the timer, then the receiving MCData UE 102b transmits a 'Read' notification to the transmitting MCData UE 102a.

FIG. 2 is an example off-network MCData communication system 200 in which the receiving MCData UE transmits a consolidated disposition notification to the transmitting MCData UE, according to an embodiment as disclosed herein. As depicted in the FIG. 2, the transmitting MCData UE 102a transmits (202) a one-to-one SDS message to the receiving MCData UE 102b. The one-to-one SDS message includes a SDS disposition request type IE set as 'Delivery and Read'. After receiving the one-to-one SDS message, the receiving MCData UE 102b identifies the SDS disposition request type IE in the one-to-one SDS message which is set as 'Delivery and Read'.

Further, the receiving MCData UE 102b initiates (204) a timer (i.e., TFS3 timer, which is related to the off-network data communication system 200). When the timer is running and the one-to-one SDS message is read (206) by the MCData client at the receiving MCData UE 102b (i.e., before the expiry of the timer), then the receiving MCData UE 102b stops the timer and transmits (208) the consolidated disposition notification which includes 'Delivery and Read' notification to the transmitting MCData UE 102a. The time interval or the value of the TFS3 timer for transmitting the consolidated disposition notification to the transmitting MCData UE 102b is configurable.

Although not shown in the FIG. 2, the receiving MCData UE 102b transmits a Delivered to the transmitting MCData UE 102a when the one-to-one SDS message is not read before expiry of the timer. In an embodiment, the receiving MCData UE 102b transmits a Read notification to the transmitting MCData UE 102a when the one-to-one SDS message is read after expiry of the timer.

Thus, with the proposed exemplary embodiment, in the off-network MCData communication system 200, the receiving MCData UE 102b initiates the TFS3 timer and transmits the consolidated disposition notification to the transmitting MCData UE 102a by stopping the timer when the one-to-one SDS message is read before expiry of the timer. This reduces the number of transmissions of Delivery notification and Read notification separately to the transmitting MCData UE 102b.

Figure 3:
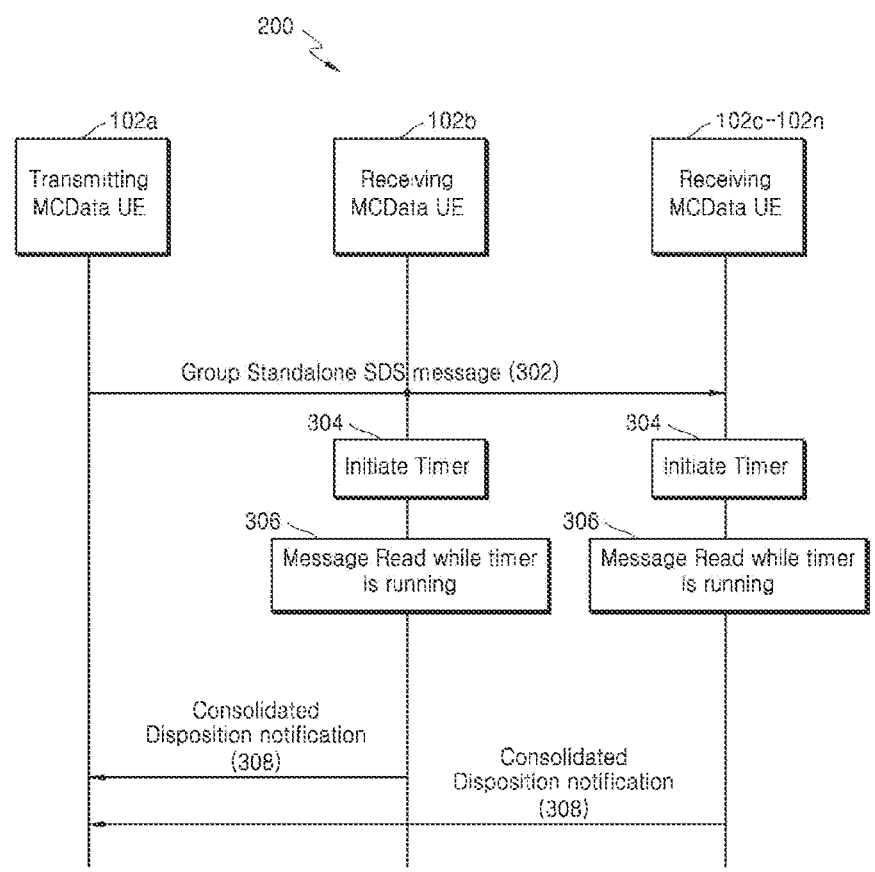
FIG. 3 is an example off-network MCData communication system in which the plurality of receiving MCData UE transmit a consolidated disposition notification each to the transmitting MCData UE, according to an embodiment as disclosed herein.

FIG. 3 is an example off-network MCData communication system 200 in which the plurality of receiving MCData UE transmit a consolidated disposition notification each to the transmitting MCData UE, according to an embodiment as disclosed herein.

For the group communication, the transmitting MCData UE 102a transmits (302) a group SDS message to the receiving MCData UE 102b and a plurality of receiving MCData UEs 102c-102n. The group SDS message includes a SDS disposition request type IE set as 'Delivery and Read'. After receiving the group SDS message, each of the receiving MCData UE (i.e., 102b and 102c-102n) identifies the SDS disposition request type IE in the group SDS message which is set as 'Delivery and Read'.

Further, each of the receiving MCData UE 102b initiates (304) a timer (i.e., TFS3 timer) after identifying the SDS disposition request type IE (which is set as 'Delivery and Read'). When the timer is running and the group SDS message is read (306) by the MCData client at the receiving MCData UE (102b) before the expiry of the timer, then each one of the receiving MCData UEs (102b, 102c-102n) stops the running timer and transmits (308) the consolidated disposition notification individually which includes a 'Delivery and Read' notification to the transmitting MCData UE 102a. The time interval or the value of the TFS3 timer for transmitting the consolidated disposition notification to the transmitting MCData UE 102b is configurable.

Although not shown in the FIG. 3, in case where the group SDS message is not read before the expiry of timer (i.e., TFS3 timer), the receiving MCData UEs 102b and 102c-102n transmit a 'Delivered' notification to the transmitting MCData UE 102a. In another scenario, where the group SDS message is read after expiry of the timer, then the receiving MCData UE 102b and 102c-102n transmit a 'Read' notification to the transmitting MCData UE 102a.

Figure 4:
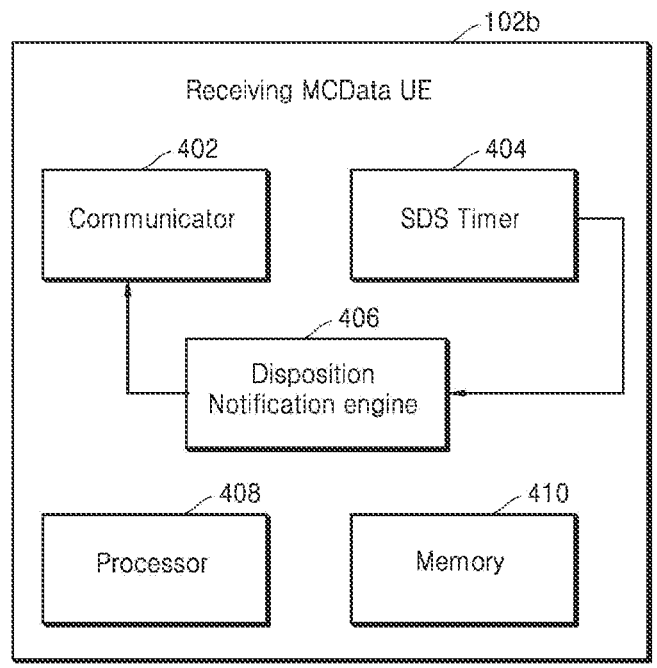
FIG. 4 is a block diagram illustrating various hardware components of the receiving MCData UE, according to an embodiment as disclosed herein.

FIG. 4 is a block diagram illustrating various hardware components of the receiving MCData UE 102a, according to an embodiment as disclosed herein. The receiving MCData UE includes a communicator 402, a SDS timer 404, a Disposition notification engine 406, a processor 408 and memory 410.

In an embodiment, the communicator 402 can be configured to receive the one-to-one SDS message from the transmitting MCData UE 102a in case of one-to-one communication in both on-network MCData communication system 100 and off-network MCData communication system 200.

In another embodiment, the communicator 402 can be configured to receive the group SDS message from the transmitting MCData UE 102a in case of group MCData communication in both on-network MCData communication system 100 and off-network MCData communication system 200.

Further, the communicator 402 can also be configured to transmit the consolidated disposition notification message to the transmitting MCData UE 102a when the IE in the disposition notification is set or enabled as 'Delivery and Read' in the one-to-one SDS message or the group SDS message transmitted by the transmitting MCData UE 102a.

The SDS timer 404 includes a TDU1 timer and TFS3 timer. The receiving MCData UE 102b initiates the timer TDU1 upon receiving the SDS message from the transmitting MCData UE 102a in the on-network MCData communication system 100. The receiving MCData UE 102b initiates the timer TFS3 upon receiving the SDS message from the transmitting MCData UE 102a in the off-network MCData communication system 200.

The time interval associated with the timers TDU1 and TFS3 are configurable.

The Disposition notification engine 406 is configured to transmit the consolidated disposition to the transmitting MCData UE 102a when the disposition request type IE is set as 'Delivery and Read' in the one-to-one request message or the group request message received from the transmitting MCData UE 102a.

In an embodiment, the Disposition notification engine 406 is configured to stop the running timer and transmit the consolidated disposition to the transmitting MCData UE 102a when the SDS message is read before expiry of the timer (i.e., timer TDU1 in the on-network MCData communication system 100 or timer TFS3 in the off-network communication system 200).

In various embodiments, the Disposition notification engine 406 is configured to transmit a 'Delivered' notification to the transmitting MCData UE when the SDS message is not read before expiry of the timer (i.e., timer TDU1 in the on-network MCData communication system 100 or timer TFS3 in the off-network communication system 200).

In another embodiment, the Disposition notification engine 406 is configured to transmit a 'Read' notification to the transmitting MCData UE 102a when the SDS message is read after expiry of the timer.

In an embodiment, the processor 408 (for example; a hardware unit, an apparatus, a Central Processing Unit (CPU), a Graphics Processing Unit (GPU), etc.) communicatively coupled to a memory 410 (e.g., a volatile memory and/or a non-volatile memory); the memory 410 includes storage locations configured to be addressable through the processor 408.

In an embodiment, the memory 410 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 410 may, in some examples, be considered a non-transitory storage medium. The term "non-transitory" may indicate that the storage medium is not embodied in a carrier wave or a propagated signal. However, the term "non-transitory" should not be interpreted that the memory 408 is non-movable. In some examples, the memory 410 can be configured to store larger amounts of information than the memory. In certain examples, a non-transitory storage medium may store data that can, over time, change (e.g., in Random Access Memory (RAM) or cache).

Figure 5:
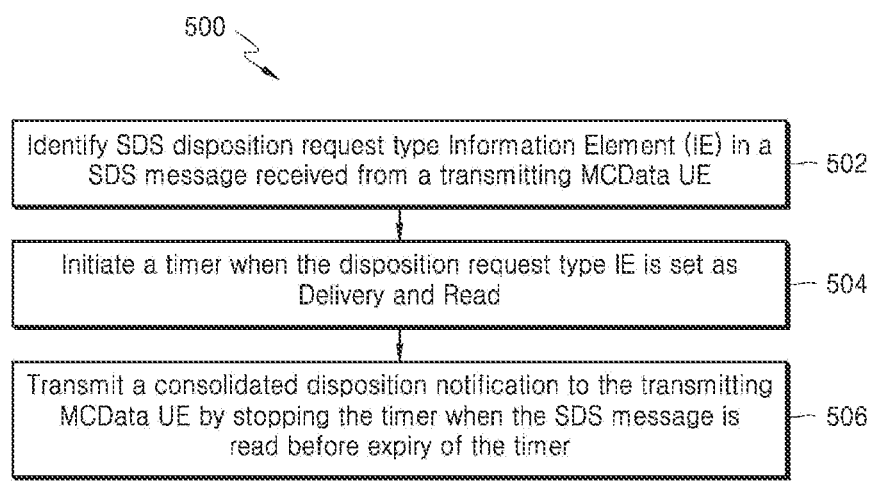
FIG. 5 is a flow diagram illustrating a method for managing disposition of notifications when a disposition request type Information Element (IE) is set as Delivery and Read in a Short Data Service (SDS) message, according to an embodiment as disclosed herein.

FIG. 5 is a flow diagram 500 illustrating a method for managing disposition of notifications when a disposition request type Information Element (IE) is set as 'Delivery and Read' in a Short Data Service (SDS) message, according to an embodiment as disclosed herein. The various steps of the flow diagram 500 are performed by the Disposition notification engine 406.

At step 502, the method includes identifying the SDS disposition request type IE in the SDS message received from the transmitting MCData UE 102a.

At step 504, the method includes initiating a timer (i.e., a TDU1 timer for on-network MCData communication system 100 or TFS3 timer for off-network MCData communication system 200) when the disposition request type IE is set as 'Delivery and Read'.

At step 506, the method includes transmitting the consolidated disposition notification to the transmitting MCData UE 102a by stopping the timer when the SDS message is read before expiry of the timer.

Figure 6:
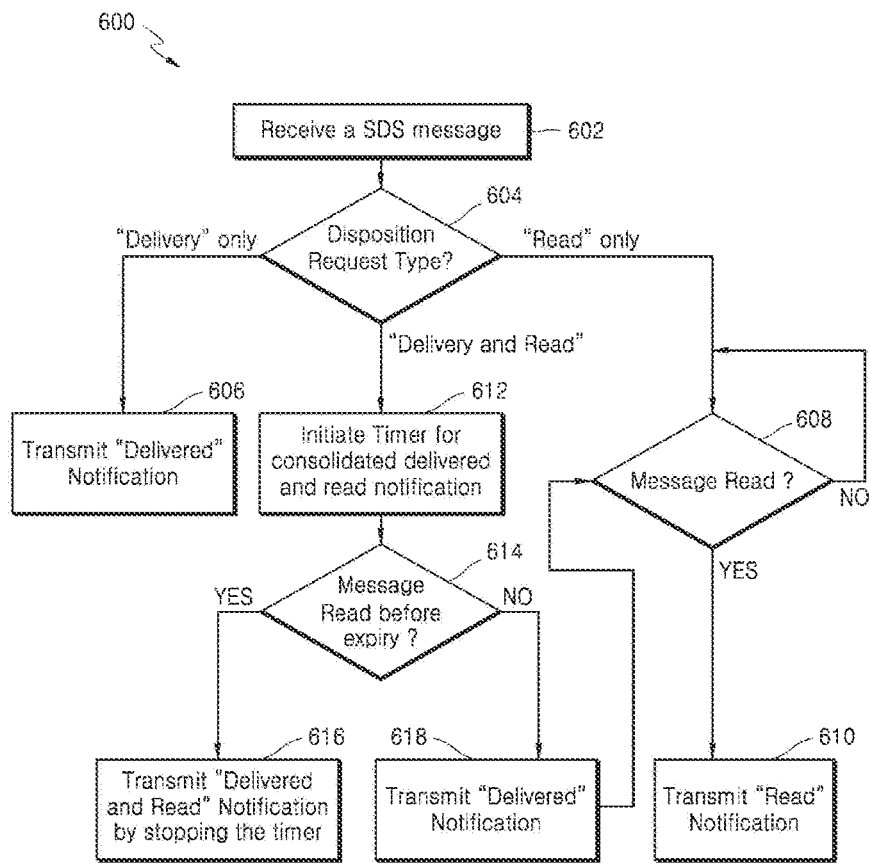
FIG. 6 is a flow diagram illustrating a method for managing disposition of notifications based on disposition request type IE set in the SDS message, according to an embodiment as disclosed herein.

FIG. 6 is a flow diagram 600 illustrating a method for managing disposition of notifications based on the disposition request type Information Element (IE) set in the SDS message, according to an embodiment as disclosed herein. The various steps of the flow diagram 600 are performed by the Disposition notification engine 406.

At step 602, the method includes receiving a SDS message from a transmitting MCData UE 102a. At step 604, the method includes determining the disposition request type IE in the received SDS message.

In an embodiment, at step 604, if it is determined that the disposition request type IE in the SDS message is set as "Delivery Only" then, at step 606, the method includes sending a delivered notification to the transmitting MCData UE 102a and the method terminates after sending the delivered notification.

In an embodiment, at step 604, if it is determined that the disposition request type IE is set as "Read Only" then, at step 608, the method includes determining whether the SDS message is read. Further, at step 610, the method includes sending a read notification to the transmitting MCData UE 102*a* and the method terminates in response to determining that the SDS message is read.

Further, in an embodiment, at step 604, if it is determined that the disposition request type IE is set as "Delivery and Read" then, at step 612, the method includes staring a timer (i.e., timer TDU1 in the on-network MCData communication system 100 or timer TFS3 in the off-network communication system 200) for transmitting a consolidated disposition notification (which includes a delivery and read notification). At step 614, the method includes determining whether the SDS message is read before expiry of the timer started in step 612. In an embodiment, at step 614, if it is determined that the SDS message is read before expiry of the timer then, at step 616, the method includes transmitting a consolidated disposition notification for the SDS message (with delivery and read notification) to the transmitting MCData UE 102*a* by stopping the timer started in step 612 and the method terminates after sending the consolidated disposition notification.

In another embodiment, at step 614, if it is determined that the message is not read before expiry of the timer then, at step 618, the method includes sending a delivered notification to the transmitting MCData UE 102*a*. Further, after sending a delivered notification to the transmitting MCData UE 102*a*, at step 618, the method includes determining whether the SDS message is read as in step 608. Further, at step 610, the method includes sending a read notification to the transmitting MCData UE 102*b* and the method terminates in response to determining that the SDS message is read.

Unlike the conventional mechanisms, the proposed exemplary embodiment can be used to consolidate the "delivered" notification and "read" notification at the client into a single "delivered and read" notification upon receipt of a short data service message. This consolidation helps in reducing the disposition notification traffic by up to 50% which results in less resource consumption in both on-network MCData communication system 100 and the off-network MCData communication system 200.

Figure 7:
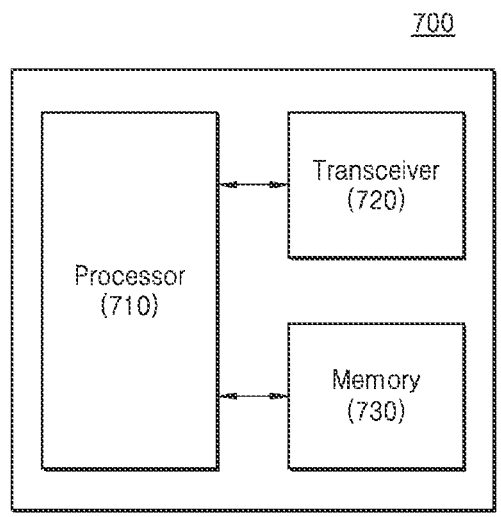
FIG. 7 is a block diagram illustrating the MCData UE according to an embodiment as disclosed herein.

FIG. 7 is a block diagram illustrating the MCData UE according to an embodiment as disclosed herein.

Referring to the FIG. 7, the MCData UE 700 may include a processor 710, a transceiver 720 and a memory 730. However, all of the illustrated components are not essential. The MCData UE 700 may be implemented by more or less components than those illustrated in FIG. 7. In addition, the processor 710 and the transceiver 720 and the memory 730 may be implemented as a single chip according to another embodiment.

The aforementioned components will now be described in detail.

The processor 710 may include one or more processors or other processing devices that control the proposed function, process, and/or method. Operation of the transmitting MCData UE or receiving MCData UE may be implemented by the processor 710. The term "transmitting" and "receiving" herein are used merely for labeling purpose and can be used interchangeably without departing from the scope of the embodiments.

The processor 710 may identify SDS disposition request type Information Element (IE) in a SDS message received from a transmitting MCData UE. The processor 710 may initiate a timer when the disposition request type Information Element (IE) is set as Delivery and Read. The processor 710 may transmitting a consolidated disposition notification through the transceiver 720 to the transmitting MCData UE by stopping the timer when the SDS message is read before expiry of the timer.

The transceiver 720 may include a RF transmitter for up-converting and amplifying a transmitted signal, and a RF receiver for down-converting a frequency of a received signal. However, according to another embodiment, the transceiver 720 may be implemented by more or less components than those illustrated in components.

The transceiver 720 may be connected to the processor 710 and transmit and/or receive a signal. The signal may include control information and data. In addition, the transceiver 720 may receive the signal through a wireless channel and output the signal to the processor 710. The transceiver 720 may transmit a signal output from the processor 1010 through the wireless channel.

The memory 730 may store the control information or the data included in a signal obtained by the MCData UE 700. The memory 730 may be connected to the processor 710 and store at least one instruction or a protocol or a parameter for the proposed function, process, and/or method. The memory 730 may include read-only memory (ROM) and/or random access memory (RAM) and/or hard disk and/or CD-ROM and/or DVD and/or other storage devices.

The embodiments disclosed herein can be implemented through at least one software program running on at least one hardware device and performing network management functions to control the elements. The hardware described herein can be a consolidated notification manager configured for consolidating disposition notifications at the receiving client for any messaging services.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method, performed by a receiving Mission Critical Data (MCData) User Equipment (UE) in a wireless communication system, the method comprising:
   receiving, from a transmitting MCData UE, a short data service (SDS) message including a disposition request type Information Element (IE);
   initiating a timer in case that the disposition request type IE is set as Delivery and Read; and
   in case that a display indication is received based on reading the SDS message before expiry of the timer, stopping the timer and transmitting a consolidated disposition notification to the transmitting MCData UE.

2. The method of claim 1, wherein the consolidated disposition notification includes a Delivery and Read notification.

3. The method of claim 1, further comprising:
in case that the display indication is not received before expiry of the timer, transmitting a Delivered notification to the transmitting MCData UE.

4. The method of claim 3, further comprising:
in case that the display indication is received after expiry of the timer, transmitting a Read notification to the transmitting MCData UE.

5. The method of claim 1, wherein a time interval associated with the timer for transmitting the consolidated disposition notification is configurable.

6. The method of claim 1,
wherein the SDS message including the disposition request type IE is transmitted via at least one of one-to-one communication and group communication.

7. The method of claim 1, wherein the consolidated disposition notification is transmitted via at least one of On-Network MCData communication system and Off-Network MCData communication system.

8. A receiving Mission Critical Data (MCData) User Equipment (UE) in a wireless communication system, comprising:
a transceiver; and
at least one processor configured to:
control the transceiver to receive, from a transmitting MCData UE, a short data service (SDS) message including a disposition request type Information Element (IE),
initiate a timer in case that the disposition request type IE is set as Delivery and Read, and
in case that a display indication is received based on reading the SDS message before expiry of the timer, stop the timer and transmit a consolidated disposition notification to the transmitting MCData UE.

9. The receiving MCData UE of claim 8, wherein the consolidated disposition notification includes a Delivery and Read notification.

10. The receiving MCData UE of claim 8, wherein the at least one processor is further configured to:
in case that the display indication is not received before expiry of the timer, control the transceiver to transmit a Delivered notification to the transmitting MCData UE.

11. The receiving MCData UE of claim 10, wherein the at least one processor is further configured to:
in case that the display indication is received after expiry of the timer, control the transceiver to transmit a Read notification to the transmitting MCData UE.

12. The receiving MCData UE of claim 8, wherein a time interval associated with the timer for transmitting the consolidated disposition notification is configurable.

13. The receiving MCData UE of claim 8, wherein the SDS message including the disposition request type IE is transmitted via at least one of one-to-one communication and group communication.

14. The receiving MCData UE of claim 8, wherein the consolidated disposition notification is transmitted via at least one of On-Network MCData communication system and Off-Network MCData communication system.

15. A non-transitory computer-readable recording medium that stores a program that, when executed by a computer, configures the computer to:
receive, from a transmitting MCData UE, a short data service (SDS) message including a disposition request type Information Element (IE),
initiate a timer in case that the disposition request type IE is set as Delivery and Read,
in case that a display indication is received based on reading the SDS message before expiry of the timer, stop the timer and transmit a consolidated disposition notification to the transmitting MCData UE.

16. The non-transitory computer-readable recording medium of claim 15, wherein the consolidated disposition notification includes a Delivery and Read notification.

17. The non-transitory computer-readable recording medium of claim 15, wherein the program, when executed by the computer, further configures the computer to:
in case that the display indication is not received before expiry of the timer, transmit a Delivered notification to the transmitting MCData UE.

18. The non-transitory computer-readable recording medium of claim 17, wherein the program, when executed by the computer, further configures the computer to:
in case that the display indication is received after expiry of the timer, transmit a Read notification to the transmitting MCData UE.

19. The non-transitory computer-readable recording medium of claim 15, wherein a time interval associated with the timer for transmitting the consolidated disposition notification is configurable.

20. The non-transitory computer-readable recording medium of claim 15, wherein the SDS message including the disposition request type IE is transmitted via at least one of one-to-one communication and group communication.

* * * * *